United States Patent Office 3,247,213
Patented Apr. 19, 1966

3,247,213
HETEROCYCLIC NITROGEN COMPOUNDS
Karl H. Büchel, Beuel (Rhine), Hans J. Schulze-Steinen, Gut Drechen uber Werl, and Friedrich W. A. G. K. Korte, Hangelar uber Siegburg, Germany, assignors to Shell Oil Company, New York, N.Y., a corporation of Delaware
No Drawing. Filed Jan. 29, 1962, Ser. No. 169,604
Claims priority, application Germany, Apr. 12, 1961, S 73,449
6 Claims. (Cl. 260—291)

This invention relates to novel heterocyclic nitrogen compounds and to a general process for the production of heterocyclic nitrogen compounds.

It is known [Angewandte Chemie, 71, 719 (1959)] that in acid catalyzed hydrolysis alpha-acyl-gamma-lactones and alpha-acyl-delta-lactones can be readily converted in a single step into the corresponding 4,5-dihydrofuran-3-carboxylic acid and 5,6-dihydropyran-3-carboxylic acid, respectively. The conversion proceeds according to the general reaction which is exemplified for an alpha-acyl-delta-lactone in the following equation:

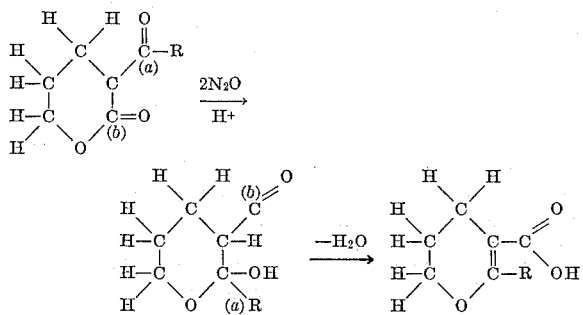

wherein the symbols (a) and (b) identify the same carbon atoms in the equations.

Hitherto it has not been possible to carry out the above conversion with an alpha-acyl lactam in place of an alpha-acyl lactone. [See, for example, G. Römer, Thesis, University of Bonn, page 76 (1959) and H. Mader, Thesis, University of Bonn, pages 34–37 (1960).] It is known [Ber. 61, page 327 (1928)] that a hydrolytic ring-opening of alpha-acyl lactams with decarboxylation can be achieved by heating them to 130° C. with concentrated hydrochloric acid in a bomb. It is then necessary to close the ring and this recyclization to the hetero ring is only possible by indirect means, for example, in the synthesis of nicotine according to the following scheme:

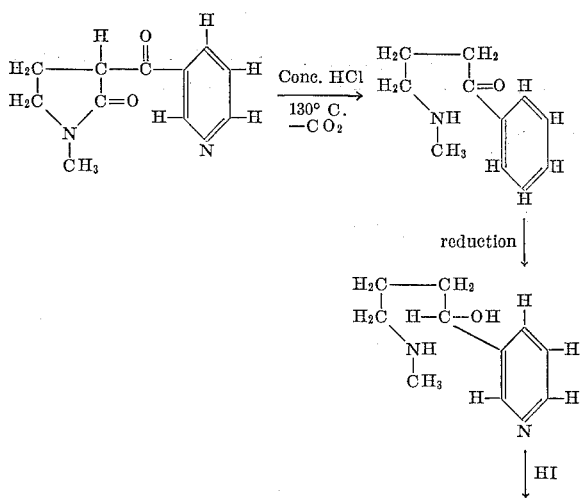

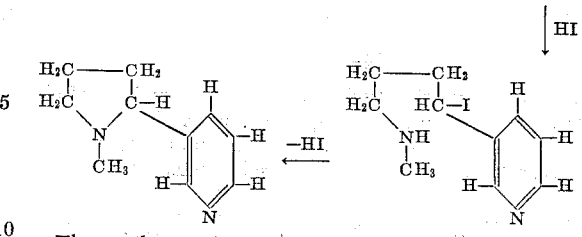

The syntheses of myosmine (Ber. 69 (1936) page 757) and anabasine (Ber. 69 (1936) page 1082) are similar but with the omission of the iodization step.

It will be understood that the said known syntheses are usually carried out in a bomb at high temperatures in more than one step, and in three or four steps as shown in the above examples.

It has now been found that alpha-acyl-N-alkyl-gamma- and delta-lactams, as well as alpha-acyl-N-acyl-gamma- and delta-lactams, can be converted respectively into unsaturated N-heterocyclic amines or carboxylic acids by merely heating them in aqueous acids.

It is an object of the present invention to provide a class of novel nitrogen containing compounds with unusually good properties as insecticides. It is a further object of the present invention to provide a convenient process for the preparation of these and other useful compounds. Further objects of the invention are set forth in the following detailed disclosure of the invention.

The invention therefore relates to a process for the production of heterocyclic nitrogen compounds having the following formulas:

(I)

and (II)
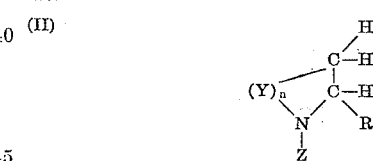

by the acid-catalyzed hydrolysis and simultaneous decarboxylation of a compound having the general formula:

(III)
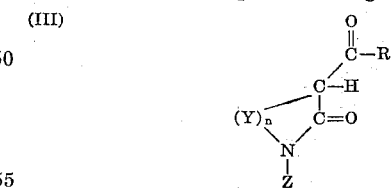

to form compound (I) followed by the hydrogenation of (I) to form the saturated compounds (II). The composite reactions may thus be represented by the following equations:

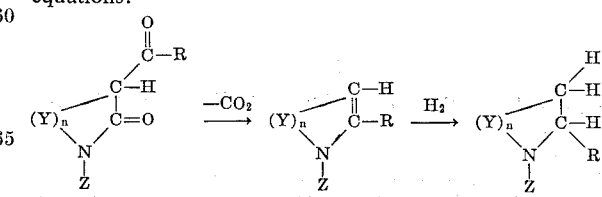

In the above formulas and equations, R is selected from the group consisting of the hydrogen atom, alkyl, aryl, alkaryl, carboxyl, carbalkoxy (alkoxycarbonyl), radicals of from 1 to 20 carbon atoms, and heterocyclic radicals of from 4 to 6 ring atoms in which the hetero atom is a member of the group consisting of nitrogen and the chalkogens. When the hetro atom is a chalkogen, elements of atomic number from 8 to 16, inclusive, are preferred (O and S). Thus, a class of particularly suitable hetero atoms are those elements of atomic number N wherein $$N = (8-n)_m$$

where $n$ is a whole number from 0 to 1, $m$ is a whole number from 1 to 2, and $n+m$ is 1 to 2. Y represents a methylene bridge of from 2 to 3 methylene groups. These methylene groups may be substituted by members selected from the group consisting of alkyl, aryl, alkaryl, carboxyl and carbalkoxy radicals. Specific examples of appropriate alkyl groups include methyl, ethyl, propyl, butyl, and in general alkyl groups of from 1 to 10 carbon atoms are suitable. Alkyl groups of from 1 to 6 carbon atoms are preferred. Suitable aryl groups include the phenyl group and alkyl-substituted phenyl groups (including phenyl groups with from 1 to 5 alkyl substituents). Lower alkyl substituents (1 to 4 carbon atoms) are most suitable. Condensed ring systems such as the naphthyl radical are also suitable as well as the monovalent radical formed from biphenyl by removal of a hydrogen atom. Suitable carbalkoxy (alkoxycarbonyl) groups are the carbmethoxy (—COOCH$_3$), carbethoxy (—COOC$_2$H$_5$), carbpropoxy (—COOC$_3$H$_7$), and carbutoxy (—COOC$_4$H$_9$)

radicals. Carbalkoxy (alkoxycarbonyl) radicals with from 1 to 12 carbon atoms in the alkoxy moiety may be used. The symbol Z represents an alkyl or acyl group. When Z is alkyl, Z may be any of the alkyl groups described in the definition of R or in the definition of the substituents on the methylene group, Y. When Z is an acyl group, Z may be represented by the group:

wherein R has the previously defined meaning. When R is a heterocyclic system, R may be pyridyl, thiophenyl, furanyl, as well as homologs of these radicals formed from alkyl-substituted pyridine, thiophene and furan. Homologs of thiophene can be made by the reaction of 1,4-diketones with phosphorus pentasulfide according to the reaction:

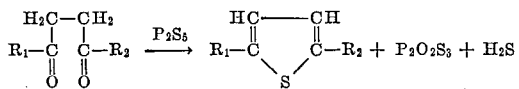

wherein R$_1$ and R$_2$ are each alkyl radicals of from 1 to 6 carbon atoms. Similar reactions of 1,4-diketones lead to substituted furans and pyrroles. Radicals formed from substituted dihydropyridines are also suitable.

Many of the compounds of the present invention are resonance stabilized. That is, electron shifts within the molecule which do not disturb the spatial relationships of the atoms are possible. Such shifts allow the double bonds in structures such as thiophene and pyrrole to appear between different atoms. Thus, the equations:

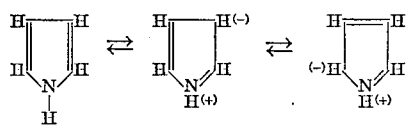

represent the various structures which may result from electronic shifts. In this application it is to be understood that the conventional formulas employed represent resonance "hybrids" and that structural formulas formed by shifting electrons are included within the scope of the conventional structural formulas. Similar remarks apply to the description of the stereoisomers which are included by the planar structural formulas used in this application.

In addition to resonance stabilization, the pyrroles are further characterized by the tautomeric structures of the imine-ketimine system:

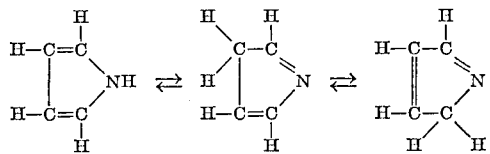

With an alpha-acyl-N-alkyl-gamma-lactam, the reaction of the present invention proceeds as follows:

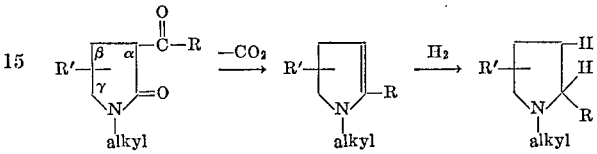

In these equations, the $\alpha$, $\beta$ and $\gamma$ positions are given in relation to the ring carbonyl as shown in the equations. Suitable alkyl radicals include methyl, ethyl, propyl, i-propyl, t-butyl, n-butyl, s-butyl, amyl, and in general alkyl radicals with from 1–12 carbon atoms. R may be hydrogen, alkyl, carboxyl, carbalkoxy, aryl, alkaryl, or a heterocyclic nitrogen or chalkogen-containing ring radical with 4 to 6 ring atoms and 1 to 3 nitrogen or chalkogen atoms. R' may be hydrogen, alkyl, aryl, aralkyl, alkaryl, carboxyl or carbalkoxy (alkoxycarbonyl). Lower alkyl radicals (1–4 carbon atoms) are preferred R' substituents. Aryl radicals such as phenyl, the radical formed from biphenyl by removal of a hydrogen atom and naphthyl are suitable. Aralkyl radicals such as benzyl may also be used as well as alkaryl radicals such as tolyl and xylyl. In addition R' may form an added ring system such as the ring systems characteristic of the compounds indole and quinoline.

With an alpha-acyl-N-alkyl-delta-lactam, the reaction proceeds similarly, where R, R' and alkyl have the aforementioned meanings:

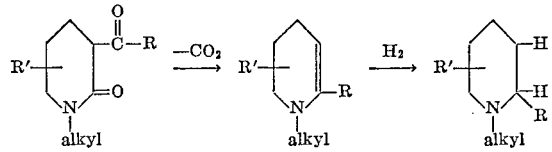

When an alpha-acyl-N-acyl-gamma-lactam is employed, the reaction is:

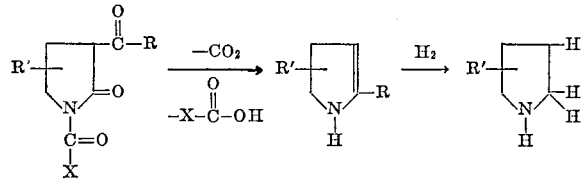

In the case of an alpha-acyl-N-acyl-delta-lactam, the following similar reaction scheme is applicable:

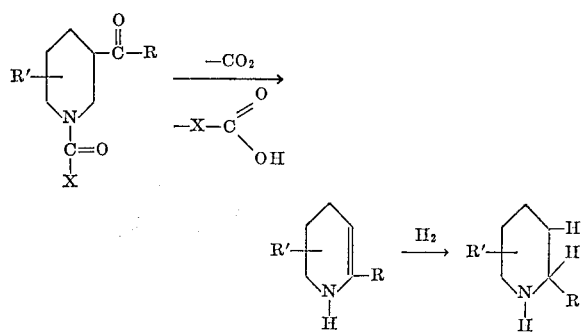

In these equations R and R' have the same significance as in the previous equations and X represents an alkyl group of from 1 to 10 carbon atoms, or an aryl group of no more than 20 carbon atoms. Suitable alkyl groups include methyl, ethyl, propyl, butyl, amyl and hexyl groups; alkyl groups of from 1 to 8 carbon atoms are preferred. Aryl groups such as phenyl, tolyl, xylyl, cymyl, cumyl, naphthyl, benzyl, duryl and biphenylyl are also suitable X radicals.

Suitable catalysts and reaction media for the acid-catalyzed hydrolysis according to the present invention are the mineral acids (for example, hydrochloric acid, sulfuric acid, nitric acid, and perchloric acid) and organic acids (such as acetic acid and trifluoroacetic acid) as well as ion exchange materials (such as ion exchange resins) containing acid groups. In general, the ionization constant of the acid should be at least $10^{-6}$. Acids with an ionization constant greater than $10^{-5}$ are suitable. Highly concentrated hydrochloric acid such as 6 N to 12 N aqueous solutions are particularly preferred.

The reactions may be carried out at room temperature or at elevated temperatures. Thus, temperatures of from about 5° C. to 340° C. may be used. Very good yields are obtained at the boiling point of the aqueous acids and these temperatures are particularly preferred. Thus, an azeotropic mixture of 28.4% by weight of water and 71.6% by weight of perchloric acid boils at approximately 203° C. at 1 atmosphere pressure. An azeotropic mixture of 79.76% by weight of water and 20.24% by weight of hydrochloric acid boils at 110° C. at 760 mm. Hg pressure. The most preferred temperature range is from 15° C. to 150° C.

The alpha-acyl-lactams used as the starting compounds of the present invention are preferably obtained by the Claisen ester condensation reaction of a lactam and a carboxylic acid ester:

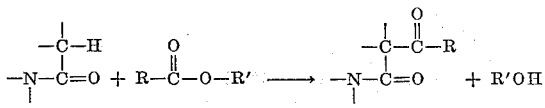

The compounds of the present invention are not only valuable chemical products in themselves but are also suitable for use as intermediate products for the synthesis of other valuable chemical products, for example, the enamines and pharmaceutical products. The nicotine and anabasine derivatives are especially useful as plant protectants and as insecticides. The amino acids (for example, proline and hygric acid) are known to be the building blocks out of which the complex protein molecules are constructed. The method of producing the compounds of the present invention makes it possible to vary the chemical and physical properties of the molecules by variation of the substituents on the heterocyclic rings in the compounds. Variation of the substituents on the carbon atoms of the ring as well as on the nitrogen atom causes variations in the toxicity of the nicotine and anabasine derivatives. Thus, it is possible to vary toxicity by the molecular structure itself rather than by mere physical dilution of a highly toxic substance or a substance of fixed toxicity. The new compounds of the present invention are unusually good as insecticides, especially against insects which have built up resistance against similar insecticides.

Details of this invention are best described by the following examples. It is to be understood that the examples are submitted for illustrative purposes only and are not to be construed as limiting the invention in any respect.

EXAMPLE I

This example illustrates the general reaction:

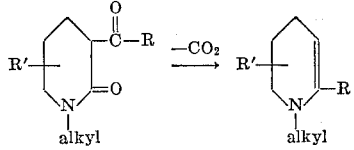

when the alkyl group is $-CH_3$, R' is H, and R is

(3-pyridyl). The reaction thus becomes:

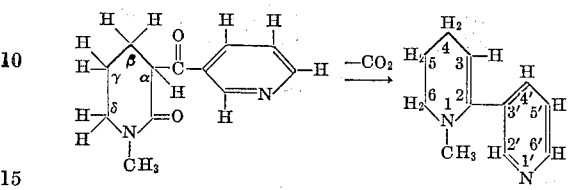

*1-methyl-2,3'-pyridyl-$\Delta^{2,3}$-tetrahydropyridine*
(*N-methyl-anabasine*)

Ten grams of alpha-nicotinoyl-N-methyl-piperidone-2 (alpha-nicotinoyl-N-methyl-$\delta$-valerolactam) were dissolved in 50 cc. of concentrated hydrochloric acid and heated with reflux until carbon dioxide evolution was complete (about 4–5 hours). The hydrochloric acid solution was then alkalized with a caustic alkali solution with ice cooling and the solution shaken with chloroform. The aqueous solution was then continuously extracted with chloroform for 24 hours, all the chloroform extracts were dried, chloroform removed by suction and the residue (10.5 g.) distilled in vacuo. At a boiling point or 133–135° C. (12 mm.) 6.1 g. of N-methyl-anabasine (76% of theory) was obtained in the form of a colorless oil. The product turned dark brown very soon, even in a closed vessel.

IR spectrum: $\gamma_{C=C}=1635$/cm.
UV spectrum:
$\lambda_{max_1}=201$ m$\mu$ log $\epsilon=4.09$.
$\lambda_{max_2}=292$ m$\mu$ log $\epsilon=3.46$ shoulder at 255 m$\mu$.
$C_{11}H_{14}N_2$ (174.2)—Calc.: C, 75.82; H, 8.10; N, 16.08.
Found: C, 75.83; H, 8.03; N, 15.81.
Monopicrate: recrystallized from ethanol; yellow needles with a melting point of 128–129.5° C.

Lower alkyl-substituted (1–4 carbon atoms) pyridyl radicals such as the picolines, the lutidines, the collidines, and aldehydine (2-methyl-5-ethylpyridine) react similarly and are suitable R groups.

EXAMPLE II

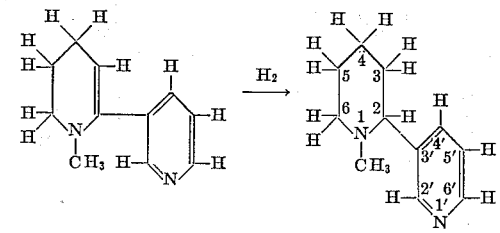

*1-methyl-2,3'-pyridyl-piperidine (d,l-N-methyl-anabasine)*

Six grams of N-methyl-anabasine were dissolved in 100 cc. of glacial acetic acid, 2 g. of a 5% mixture of palladium and carbon added and the whole hydrogenated at normal pressure on a shaking apparatus. Hydrogen taken up 0.82 l. The catalyst was filtered off, the glacial acetic acid extensively distilled off in vacuo and the residue alkalized with a concentrated aqueous sodium carbonate solution and this was followed by 12 hours of continuous extraction with chloroform. After the chloroform had been removed by suction, 5.9 g. of residue were obtained which were distilled in vacuo. N-methyl-anabasine was obtained in the form of a colorless oil with a boiling point of 62° C. (0.4 mm. Hg). Yield: 5.7 g. (94% of theory).

UV absorption:
 $\lambda_{max_1}=202$ m$\mu$ log $\epsilon=3.86$.
 $\lambda_{max_2}=257$ m$\mu$ log $\epsilon=3.40$.
 $\lambda_{max_3}=262.5$ m$\mu$ log $\epsilon=3.45$.
 $\lambda_{max_4}=268$ m$\mu$ log $\epsilon=3.31$.
$C_{11}H_{16}N_2$ (176.3)—Calc.: C 74.95; H 9.15; N 15.90.
 Found: C 74.83; H 9.15; N 15.73.
Dipicrate: recrystallized from ethanol; yellow needles with a melting point of 236–238° C.

EXAMPLE III

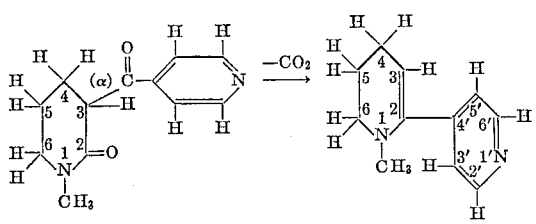

*1-methyl-2,4'-pyridyl-$\Delta^{2,3}$-tetrahydropyridine*

Twelve grams of alpha-isonicotinoyl-N-methyl-piperidone-2 (alpha-isonicotinoyl-N-methyl-δ-valerolactam) were converted in concentrated hydrochloric acid as described in Example I. $CO_2$ evolution was complete after 18 hours. Distillation of 11.8 g. of the resultant crude oil product yielded, at a boiling point of 82–85° C., 8.5 g. of 1-methyl-2,4'-pyridyl-$\Delta^{2,3}$-tetrahydropyridine (90% of theory) on the form of a colorless oil. The product turned dark brown very quickly.

IR spectrum: $\lambda_{C=C}=1635$/cm.
UV absorption:
 $\lambda_{max_1}=201$ m$\mu$ log $\epsilon=4.6$.
 $\lambda_{max_2}=218$ m$\mu$ log $\epsilon=3.92$.
 $\lambda_{max_3}=236$ m$\mu$ log $\epsilon=3.93$.
 $\lambda_{max_4}=310$ m$\mu$ log $\epsilon=3.43$.
$C_{11}H_{14}N_2$—Calc.: C 75.82; H 8.10; N 16.08. Found: C 75.88; H 8.17; N 15.74.
Dipicrate: recrystallized from ethanol, yellow needles with a melting point of 120–123° C.

EXAMPLE IV

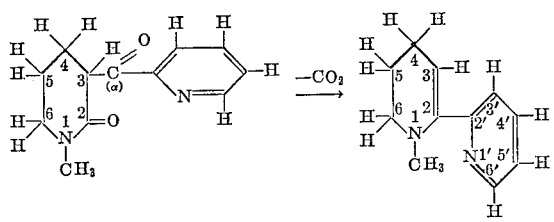

*N-methyl-2,2'-pyridyl-$\Delta^{2,3}$-tetrahydropyridine*

Twenty-one and eight-tenths grams of crystalline alpha-picolinoyl-N-methyl-piperidone-2 were heated in concentrated hydrochloric acid for 12 hours until carbon dioxide evolution was complete and worked up as described in Example I. Sixteen and five-tenths grams of a crude oil product were then distilled in vacuo and 14.5 g. (83% of theory) of N-methyl-2,2'-pyridyl-$\Delta^{2,3}$-tetrahydropyridine was obtained at a boiling point of 75° C. (0.2 mm.). The product was a colorless oil which turned dark brown after a short time.

IR spectrum: $\lambda_{C=C}=1627$/cm.
$C_{11}H_{14}N_2$ (174.2)—Calc.: C 75.82; H 8.10; N 16.08.
 Found: C 75.26; H 8.12; N 15.65.
Monopicrate: recrystallized from ethanol; yellow-orange needles with a melting point of 127–129° C.

EXAMPLE V

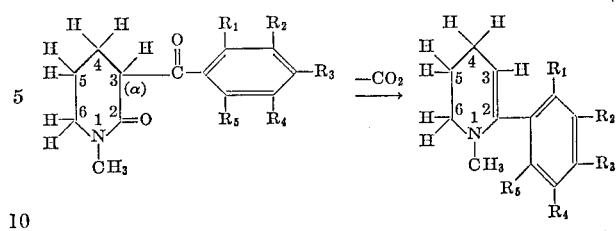

where $R_1$–$R_5$ are lower alkyl groups (1–4 carbon atoms) or hydrogen. Suitable aryl groups include tolyl, cumyl, duryl, mesitylyl, xylyl, and cymyl radicals as well as the unsubstituted phenyl groups. When $R_1$–$R_5$ are hydrogen atoms, the compound 1-methyl-2-phenyl-$\Delta^{2,3}$-tetrahydropyridine is formed.

*1-methyl-2-phenyl-$\Delta^{2,3}$-tetrahydropyridine*

Sixty grams of alpha-benzoyl-N-methyl-piperidone-2 were heated under reflux in 300 cc. of concentrated hydrochloric acid for 24 hours (until carbon dioxide evolution was complete). Hydrochloric acid solution was then worked up as described in Example I. At a boiling point of 67° C. (0.05 mm.) 1-methyl-2-phenyl-$\Delta^{2,3}$-tetrahydropyridine was obtained in the form of colorless oil. Yield: 39 g. (81% of theory).

IR spectrum: $\gamma_{C=C}=1634$/cm.
IR spectrum of the hydrochloride (in $CHCl_3$):

$$\gamma_{C=C}=1675/cm.$$

UV absorption:
 $\lambda_{max_1}=201$ m$\mu$ log $\epsilon=4.30$.
 $\lambda_{max_2}=220$ m$\mu$ log $\epsilon=3.89$ shoulder at 276 m$\mu$.
$C_{12}H_{15}N$ (173.3)—Calc.: C 83.19; H 8.73; N 8.09.
 Found: C 83.14; H 8.83; N 7.89.
Picrate: recrystallized from ethanol; bright yellow needles with a melting point of 144° C.

EXAMPLE VI

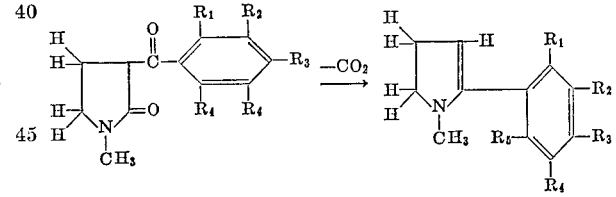

wherein $R_1$–$R_5$ are defined as in Example V. When $R_1$–$R_5$ are hydrogen atoms, the compound N-methyl-2-phenyl-2-pyrroline is formed.

*N-methyl-2-phenyl-2-pyrroline*

Fifteen grams of alpha-benzoyl-N-methyl-pyrrolidone-2, dissolved in 150 g. of concentrated hydrochloric acid, were heated with reflux. The liberated $CO_2$ was led by a weak $N_2$ stream through a wash bottle of water (for removing the HCl) and into a second bottle of baryta water (barium hydroxide) for removing carbon dioxide. After the solution had been heated for 24 hours, it was worked up as described in Example I. Nine to ten grams of crude oil were obtained which still gave a positive enol reaction. By fractional distillation in the $N_2$ stream 0.5 g. of N-methyl-2-phenyl-2-pyrroline were obtained (5% of theory) and 9 g. of the starting acyl lactam. After heating for ten days, a crude oil was obtained which gave no further $FeCl_3$ reaction. Yield 29% of theory. Bright yellow oil with a boiling point of 99° C. (7 mm.).
UV absorption:
 $\lambda_{max_1}=212$ m$\mu$ log $\epsilon=3.88$.
 $\lambda_{max_2}=259$ m$\mu$ log $\epsilon=3.93$.
IR spectrum: $\gamma_{C=C}=1625$/cm.
$C_{11}H_{13}N$ (159.2)—Calc.: C 82.97; H 8.23; N 8.80.
 Found: C 83.07; H 8.15; N 9.05.
Picrate: recrystallized from ethanol; yellow needles with a melting point of 139° C.

EXAMPLE VII

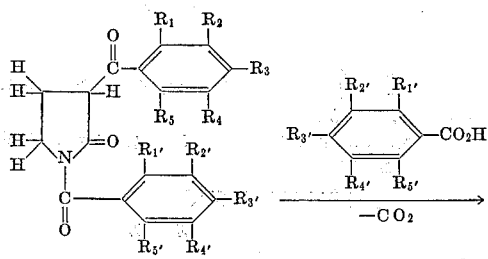

wherein $R_1$–$R_5$ are as defined in Example V, and $R_1'$–$R_5'$ may be hydrogen or an alkyl radical of from 1–10 carbon atoms. When $R_1$–$R_5$ and $R_1'$–$R_5'$ are all hydrogen atoms, the compound 2-phenyl-1-pyrroline is formed.

2-phenyl-1-pyrroline

A mixture of 76 g. of N-benzoyl pyrrolidone (0.4 mol) and 90 g. of benzoic acid ethyl ester (0.6 mol) was subjected to the Claisen ester condensation reaction by means of potassium (pulverized potassium metal). The alpha-benzoyl-N-benzoyl-pyrrolidone-2 obtained after working up was dissolved in 300 g. of concentrated hydrochloric acid and boiled with reflux. Carbon dioxide evolution (at first brisk) was completed after 3 hours. After the solution had been alkalized with $K_2CO_3$ and extracted with $CHCl_3$, 17–18 g. of the crude reaction product were obtained which was fractionated in vacuo. Fourteen and two-tenths grams of 2-phenyl-pyrroline were obtained in the form of a colorless oil with a boiling range of 116–118° C. (8 mm.) which solidified to white crystals. Yield 25% of theory, based on N-benzoyl pyrrolidone. After recrystallization from ligroin (80–110° C.) the melting point was 44° C.

UV absorption:
$\lambda_{max_1}=210$ m$\mu$ log $\epsilon=4.07$.
$\lambda_{max_2}=244$ m$\mu$ log $\epsilon=4.33$.

IR spectrum: $\gamma_{C=N}=1620$/cm.

Picrate: recrystallized from ethanol; glossy flakes with a melting point of 198° C.

EXAMPLE VIII

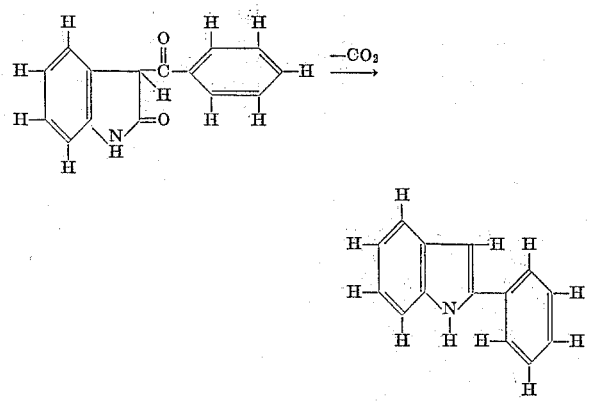

2-phenyl-indole

Thirty-two grams of 3-benzoyl-oxindole, dissolved in 150 g. of concentrated hydrochloric acid and 30 g. of dioxane as solubilizing agent were boiled with reflux (and the carbon dioxide formed collected in baryta water as described in Example VI). Carbon dioxide evolution (at first brisk) was complete after 3 hours. The solution was alkalized with ice cooling, extracted with $CHCl_3$, and the extract dried over $MgSO_4$. After the solvent had been distilled off, the 2-phenyl-indole was left in the form of a brown crystalline mass. Yield: 15.4 g.=59%. After recrystallization from ligroin (80–110° C.), white glossy flakes were obtained having a melting point of 188° C.

UV absorption:
$\lambda_{max_1}=206$ m$\mu$ log $\epsilon=4.93$.
$\lambda_{max_2}=240$ m$\mu$ log $\epsilon=4.59$.
$\lambda_{max_3}=312$ m$\mu$ log $\epsilon=4.73$.

$C_{14}H_{11}N$ (193.2)—Calc.: C 87.01; H 5.74; N 7.25. Found: C 87.12; H 5.88; N 7.33.

EXAMPLE IX

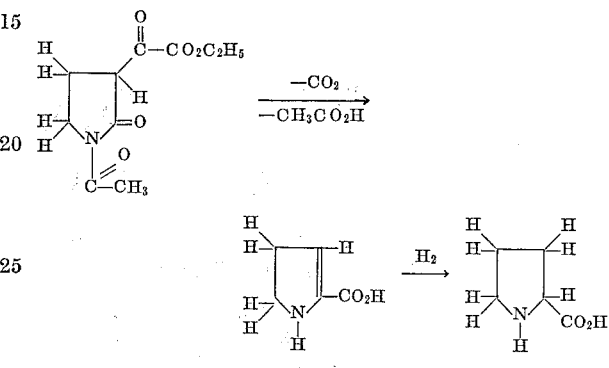

d,l-Proline

Twenty-seven grams of alpha-ethoxalyl-N-acetyl-pyrrolidone-2 were heated for 1 hour with reflux in concentrated hydrochloric acid, 1 mole of carbon dioxide being released. The hydrochloric acid solution was concentrated in vacuo to half its original volume, diluted with the same volume of $H_2O$, 0.5 g. of $PtO_2$ (according to Adams) were added and the product hydrogenated. After the catalyst has been filtered off and the hydrochloric acid solution boiled down, d,l-proline hydrochloride was obtained as a crude product. By charging this product to an ion exchange column containing Amberlite IR 45 and washing with 1.5 liters of water the hydrochloric acid was removed. After the solution was concentrated by evaporation of the solvent, 9 g. (78% of theory) of d,l-proline was obtained.

EXAMPLE X

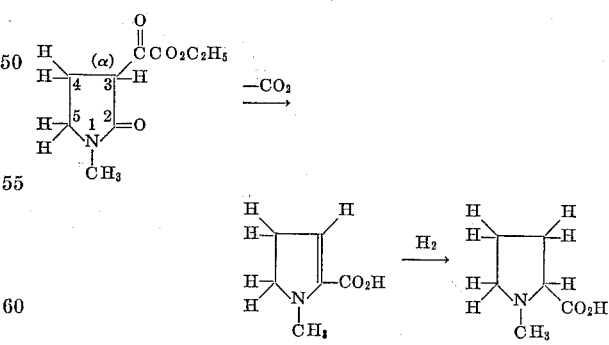

d,l-Hygric acid

Ten grams (0.05 mol) of alpha-ethoxalyl-N-methyl-pyrrolidone-2 were dissolved in 60 cc. of concentrated HCl and heated with reflux for 20 hours. The solution was concentrated to a volume of 50 cc. and after cooling filtered off from any alpha-oxalyl-N-methyl-pyrrolidone-2 which may have crystallized out. The filtrate was diluted with water, 0.5 g. of $PtO_2$ added, and hydrogenated at normal pressure and room temperature. The solution was filtered off from the catalyst and concentrated. The hygric acid hydrochloride with melting point 187° C. (9 g.=95% of theory) which crystallized out was desalted by charging it to a weakly basic ion exchanger. After the aqueous washing liquid had been concentrated, 6.3 g. of d,l-hygric acid was obtained (85% of theory). Melting point 174–175° C. (recrystallized from ethanol/ether).

IR spectrum: $\gamma_{C=O}=1620/cm$.
UV spectrum: $\lambda_{max}=199\ m\mu$ (log $\epsilon=2.24$).
$C_6H_{11}O_2N$ (129.2)—Calc.: C 55.79; H 8.58; N 10.85.
 Found: C 55.65; H 8.25; N 11.01.

EXAMPLE XI

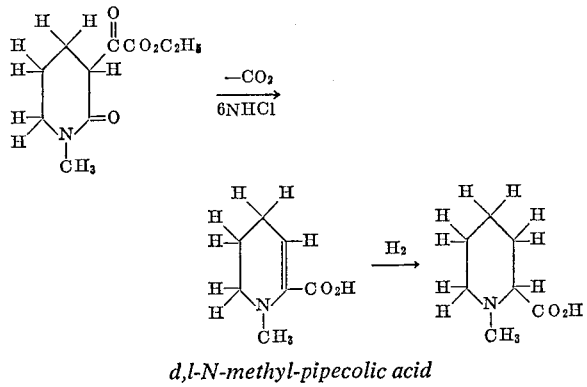

d,l-N-methyl-pipecolic acid

Twenty-one and three-tenths grams (0.1 mol) of alpha-ethoxalyl-N-methyl-pyrrolidone-2 was suspended in 100 cc. of 6 N HCl and heated to the boiling point. The solution was held at the boiling temperature with reflux for 5 minutes and 60 cc. of the hydrochloric acid was then distilled in vacuo. The residue was diluted with 40 cc. of water, 0.5 g. of $PtO_2$ was added and the product was hydrogenated at normal pressure. The solution was then filtered off from the catalyst and concentrated by evaporation of the solvent in vacuo. Seventeen and nine-tenths grams of N-methyl-pipecolic acid hydrochloride (100% of theory) were left. Recrystallized from ethanol/ether, melting point 193–194° C. The hydrochloride was dissolved in a small amount of water and freed from the hydrochloric acid by charging the product to a weakly basic ion exchanger. After the aqueous solution had been concentrated in vacuo, 14.3 g. (100% of theory) of N-methyl-pipecolic acid was obtained. Recrystallized from ethanol/ether, melting point 205–208° C.

UV spectrum: $\lambda_{max}=199\ m\mu$ (log $\epsilon=2.23$).
IR spectrum: $\gamma_{C=O}=1615/cm$.
$C_7H_{13}O_2N$ (143.2)—Calc.: C 58.72; H 9.15; N 9.78.
 Found: C 58.35; H 9.22; N 9.82.

EXAMPLE XII

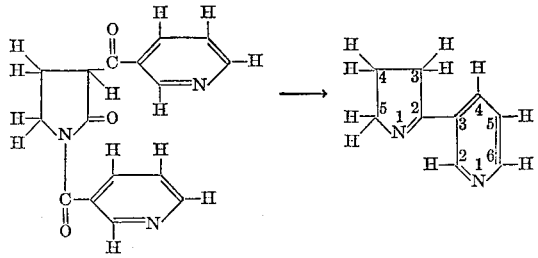

Myosmine (3[pyrrolin-2-yl]-pyridine)

Sixty-six grams of 1,3-dinicotinoyl-pyrrolidone ($FeCl_2$ reaction: green) was dissolved in concentrated HCl and boiled with reflux. Carbon dioxide evolution (at first brisk) was complete after 3 hours. The solution was cooled, alkalized with $K_2CO_3$ and extracted with $CHCl_3$. After the solution had been dried and the solvent distilled off, myosmine was obtained in the form of a yellow oil which soon crystallized and distillation (boiling point 129° C. at 7 mm.) or recrystallization from ligroin (80–110° C.) gave white glossy flakes having a melting point of 44° C. and a distinctive odor. Yield: 28.5 g.=39% of theory (basic on nicotinic acid ethyl ester) or 86% of theory (based on 1,3-dinicotinoyl pyrrolidone crude product).

IR spectrum: $\gamma_{C=N}=1620/cm$.
$C_9H_{10}N_2$(146.2)—Calc.: C, 73.94; H, 6.90; N, 19.16.
 Found: C 73.71; H 6.66; N 18.68.
Dipicrate: (from ethanol/$H_2O$, 50/50) yellow crystals, melting point 184° C.

EXAMPLE XIII

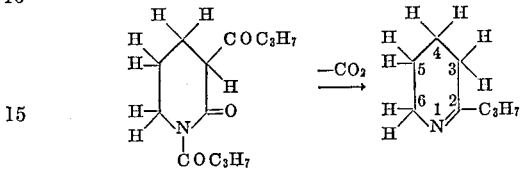

Gamma-coniceine (2-propyl-tetrahydropyridine)

Twenty-five grams of alpha-butyryl-N-butyryl-piperidone-2 (crude product) were suspended in 100 cc. of 10 N HCl and heated under reflux for 3 hours until $CO_2$ evolution was complete. The solution was saturated with $K_2CO_3$ and exhaustively extracted with chloroform. After drying over $Na_2SO_4$, the chloroform was distilled off and the residue fractionated in vacuo. Nine grams (71% of theory) of gamma-coniceine was obtained in the form of a colorless oil having a boiling point of 60–62° C. (11 mm.) $n_D^{20}=1.4602$. Picrate: yellow prisms from ethanol, melting point 76–78° C.

*NMR-structural examination of gamma-coniceine and N-methyl-gamma-coniceine*

The positions of the double bond in Examples VII, XII and XIII have been confirmed by Nuclear Magnetic Resonance (NMR) spectroscopy. The NMR spectra confirm for gamma-coniceine the $\Delta^1$-tetrahydropyridine structure and for N-methyl-gamma-coniceine the $\Delta^2$-tetrahydropyridine structure.

Although some authors describe gamma-coniceine to be 2-propoyl-$\Delta^2$-tetrahydropyridine (A)

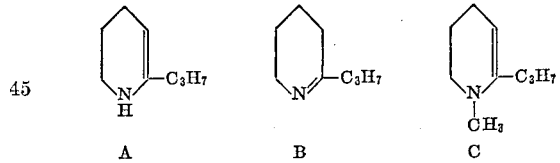

A        B        C it has been found that gamma-coniceine does not show a NH-absorption band in its IR spectrum. On the other hand, the spectrum shows a strong absorption band at 1660 cm.$^{-1}$ which may be assigned to a CN-double bond. For this reason structure B appears to be more likely. It was confirmed by NMR-spectroscopy.

The NMR-spectrum of I should give a signal in the region of olefinic protons which could not be found. The signal of the alpha-protons should be found near 7.3$\tau$ and the NH-signal near 8.0$\tau$ as they are found in piperidine. The NMR-spectrum of gamma-coniceine yields only two signal groups (see table) which can be assigned to structure B. To prove the assignment the product was hydrogenated and its NMR-spectrum recorded. Now three signal groups were found: The signal of the alpha-protons at 7.17$\tau$, of the NH-proton at 7.95$\tau$ and of the aliphatic protons in the range from 8.6 to 9.1$\tau$, which is in complete agreement with the spectrum of the unsubstituted piperidine.

Both observations, the fact that the NMR-spectrum of gamma-coniceine yield no signal in the region of olefinic protons and the unusually low $\tau$ value of the signal of the alpha-protons can only be understood for the structure given by formula B.

The NMR-spectrum of N-methyl-gamma-coniceine consists of four signal groups. The assignment is given in Table I. After hydrogenation the signal at 5.77$\tau$ (olefinic proton) disappears, so that the NMR-spectrum is in full agreement with the structure given by formula C.

TABLE I.—SIGNAL POSITIONS AND ASSIGNMENTS FOR THE DISCUSSED SUBSTANCES AND SOME RELATED COMPOUNDS

| Substance | Olefinic H in Beta-Position | Signal position* for— | | Aliphatic H in Beta- and Gamma-Position Propyl Side Chain |
|---|---|---|---|---|
| | | Alpha-Protons | NH or N—CH₃ Protons | |
|  | -------- | 5.97–6.55 | -------- | 8.05–9.12 |
| 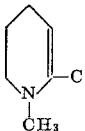 | 5.77 | 7.23 | 7.49 | 8.07–9.12 |
|  | -------- | 7.17 | 7.95 | 8.67, 8.80, 9.09 |
|  | -------- | 7.27 | 7.87 | 8.54–9.01 |
|  | -------- | 7.33 | 8.05 | 8.54 |

*τ-values are defined and explained in "Applications of Nuclear Magnetic Resonance Spectroscopy in Organic Chemistry" by L. M. Jackman on pp. 547-8 (1959).

We claim as our invention:

1. The process for the preparation of N-heterocyclic amines of the group consisting of compounds of the formulae

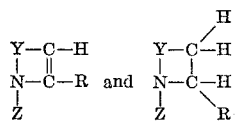

which comprises:

(a) heating the compound of the formula

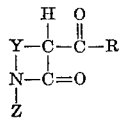

wherein:
R is a member of the group consisting of hydrogen and a radical of up to 20 carbon atoms selected from alkyl, aryl, alkaryl, carboxyl, carbalkoxy, and pyridyl, thiophenyl, furanyl and lower alkyl furanyl;
Y is a carbon atom bridge of from 2 to 3 carbon atoms substituted with a member of the group consisting of hydrogen and a radical containing up to 12 carbon atoms selected from alkyl, aryl, alkaryl, carboxyl and carbalkoxy; and
Z is a member of the group consisting of hydrogen, alkyl of 1 to 12 carbon atoms and alkanoyl of 1 to 20 carbon atoms, (b) in liquid phase in the presence of an acid having an ionization constant greater than $10^{-5}$ at temperatures of from about 5° C. to 340° C. to give the unsaturated product, and (c) hydrogenating the resulting product to form the corresponding saturated product.

2. The process for the preparation of N-heterocyclic amines of the formula

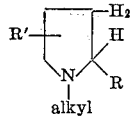

which comprises (a) heating the compounds of the formula

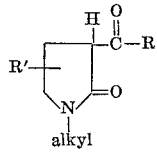

wherein alkyl is from 1–12 carbon atoms; wherein:
R is a member of the group consisting of hydrogen and a radical of up to 20 carbon atoms selected from alkyl, aryl, alkenyl, carboxyl, carbalkoxy, and pyridyl, thiophenyl, furanyl and lower alkyl furanyl;
R' is alkyl of 1 to 4 carbon atoms, (b) in liquid phase in the presence of an acid having an ionization constant greater than $10^{-5}$ at temperatures of from about 5° C. to 340° C. to give the unsaturated product, and (c) hydrogenating the resulting product to form the corresponding saturated product.

3. The process for the preparation of N-heterocyclic amines of the formula

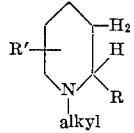

which comprises:

(a) heating the compound of the formula

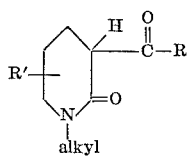

wherein alkyl is from 1–12 carbon atoms; wherein:
R is a member of the group consisting of hydrogen and a radical of up to 20 carbon atoms selected from alkyl, aryl, alkaryl, carboxyl, and pyridyl, thiophenyl, furanyl and lower alkyl furanyl;
R' is alkyl of 1 to 4 carbon atoms, (b) in liquid phase in the presence of an acid having an ionization constant greater than $10^{-5}$ at temperatures of from about 5° C. to 340° C. to give the unsaturated product, and (c) hydrogenating the resulting product to form the corresponding saturated product.

4. The process for the preperation of N-methyl-anabasine which comprises heating α-nicotinyl-N-methyl-δ-valerolactam in the presence of concentrated hydrochloric acid.

5. The process for the preparation of 1-methyl-2,4'-pyridyl-Δ²,³-tetrahydropyridine which comprises heating α-isonicotinoyl-N-methyl-δ-valerolactam in the presence of concentrated hydrochloric acid.

6. The process for the preparation of N-methyl-2,2'-pyridyl-Δ²,³-tetrahydropyridine which comprises heating α-picolinoyl-N-methyl-piperidone-2 in the presence of concentrated hydrochloric acid.

References Cited by the Examiner
UNITED STATES PATENTS

| | | | |
|---|---|---|---|
| 2,748,134 | 5/1956 | Stoll et al. | 260—294 |
| 2,854,457 | 9/1958 | Cislak | 260—296 |
| 2,882,273 | 4/1959 | Holdrege | 260—294 |
| 2,888,461 | 5/1959 | Klingsberg | 260—296 |

OTHER REFERENCES

Henry: "The Plant Alkaloids," 4th ed. pp. 35–53 (Blakiston) (1949).

Klingsberg: "Pyridine and Its Deriv.," Part 1, pp. 90, 246–7 (1960).

WALTER A. MODANCE, *Primary Examiner.*

DUVAL T. McCUTCHEN, NICHOLAS S. RIZZO, JOHN D. RANDOLPH, *Examiners.*